United States Patent

Balachandran

[11] Patent Number: 6,006,085
[45] Date of Patent: Dec. 21, 1999

[54] SYSTEM AND METHOD FOR DYNAMIC FLEXIBLE MARKETING BASED ON SYSTEM UTILIZATION

[75] Inventor: Shridharan Balachandran, El Paso, Tex.

[73] Assignee: Ericsson Inc., Research Triangle Park, N.C.

[21] Appl. No.: 09/099,999

[22] Filed: Jun. 19, 1998

[51] Int. Cl.[6] .................................................. H04B 1/06
[52] U.S. Cl. ........................... 455/406; 455/405; 455/450
[58] Field of Search ................................... 455/405, 406, 455/407, 408, 450, 62, 452, 509; 370/468, 431, 329, 348; 705/14, 10, 400

[56] References Cited

U.S. PATENT DOCUMENTS 5,579,535  11/1996  Orlen et al. .............................. 455/421
5,774,533   6/1998  Patel ....................................... 379/127
5,815,810   9/1998  Gallant et al. .......................... 455/433

Primary Examiner—Wellington Chin
Assistant Examiner—Yemane Woldetatios
Attorney, Agent, or Firm—Jenkens & Gilchrist, P.C.

[57] ABSTRACT

A telecommunications system and method is disclosed for increasing the utilization of available bandwidth, which will simultaneously maximize revenue for wireless service providers. This can be accomplished through a flexible marketing mechanism based on system utilization, which will enable service providers to tailor the system charging rate based upon the current system utilization rate. For example, a mobile subscriber can subscribe to a flexible marketing service, which monitors the number of idle channels within a cell site that the mobile subscriber is currently located in, and sends a Short Message Service (SMS) message to the mobile subscriber offering the mobile subscriber a discounted rate for calls placed within a certain time period when the number of idle channels falls below a desired system utilization ratio.

40 Claims, 4 Drawing Sheets

SYSTEM AND METHOD FOR DYNAMIC FLEXIBLE MARKETING BASED ON SYSTEM UTILIZATION

BACKGROUND OF THE PRESENT INVENTION

1. Field of the Invention

The present invention relates generally to telecommunications systems and methods for monitoring utilization of traffic channels by mobile terminals within a wireless network, and specifically to maximizing utilization of traffic channels by offering mobile subscribers discounted rates.

2. Background and Objects of the Present Invention

Wireless telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile wireless radio system in use today, and described in more detail herein.

With reference now to FIG. 1 of the drawings, there is illustrated a GSM Public Land Mobile Network (PLMN), such as wireless network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25. The radio interface between the BTS 24 and the MS 20 utilizes Time Division Multiple Access (TDMA) to transmit information between the BTS 24 and the MS 20, with one TDMA frame per carrier frequency. Each frame consists of eight timeslots or physical channels. Depending upon the kind of information sent, different types of logical channels can be mapped onto the physical channels. For example, speech is sent on the logical channel, "Traffic Channel" (TCH), and signaling information is sent on the logical channel, "Control Channel" (CCH).

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

The wireless industry is entering a high growth phase in the wireless service product life cycle. Once the produce reaches maturity, wireless network providers will be scrambling to maintain their market share. From a marketing perspective, the wireless providers have three ways of enhancing their revenue. First, wireless providers can expand into new markets, thereby increasing their customer base. Second, wireless providers can expand the use of the product, for example, by suggesting various ways of using the device. Third, wireless providers can increase their revenue by increasing the frequency of use of the service.

This last technique (increasing the frequency of use of the service) provides wireless service providers with additional revenue without installation of new infrastructure. Many wireless service providers are currently paying millions of dollars a year for a license fee to use the wireless frequencies. Hence, any unused frequency is a loss of revenue. It should be noted that the fixed cost for network providers (infrastructure) is extremely high. However, the variable cost of servicing one additional call from the customer is very low by comparison. Therefore, by maximizing the use of available bandwidth, the network providers will simultaneously increase their revenue.

It is, therefore, an object of the present invention to increase the utilization of available bandwidth, which will simultaneously increase revenue for wireless service providers.

SUMMARY OF THE INVENTION

The present invention is directed to telecommunications systems and methods for increasing the utilization of available bandwidth, which will simultaneously maximize revenue for wireless service providers. This can be accomplished through a flexible marketing mechanism based on system utilization, which will enable service providers to tailor the system charging rate based upon the current system utilization rate. For example, a mobile subscriber can subscribe to a flexible marketing service, which monitors the number of idle channels within a cell site that the mobile subscriber is currently located in, and sends a Short Message Service (SMS) message, or other similar message, to the mobile subscriber offering the mobile subscriber a discounted rate for calls placed within a certain time period when the number of idle channels falls below a desired system utilization ratio. Alternatively, the flexible marketing system described herein can be used by wireline service providers to maximize utilization of available bandwidth over wireline systems. For example, a wireline subscriber, who wishes to place a long-distance call to a specific subscriber, can call the flexible marketing system and instruct the flexible marketing system to call the wireline subscriber when the charging rate for that specific call falls below a certain rate during a time period defined by the wireline subscriber.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Every minute a wireless channel is idle is a loss of potential revenue to the service provider. One of the prime reasons limiting subscriber's use of the wireless system today is the price per minute of a call. Therefore, if a network provider can provide flexible pricing based upon the system utilization, then the system revenue can be maximized, while simultaneously maximizing the usage of the available wireless bandwidth.

Figure 1:
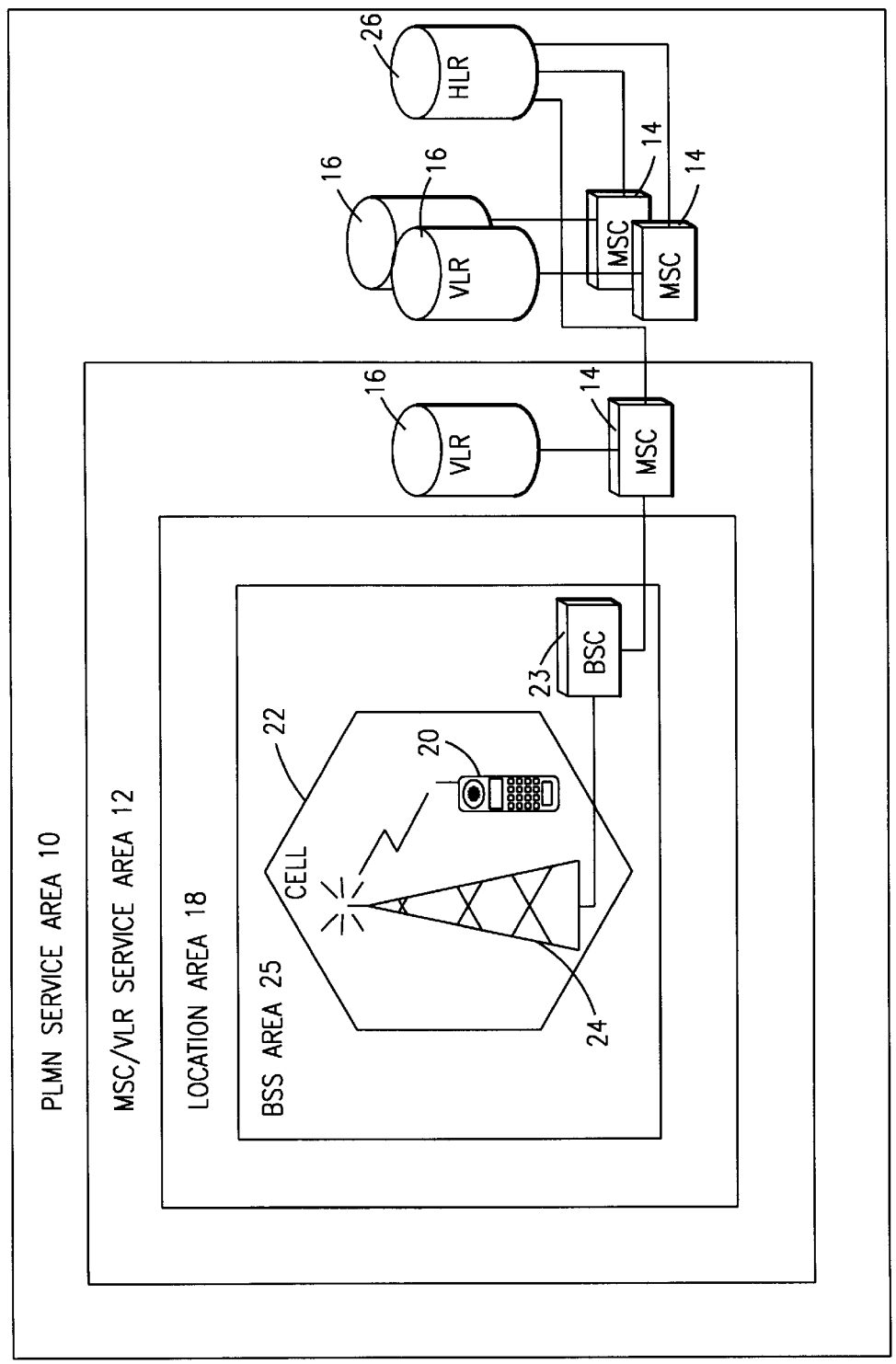
FIG. 1 is a block diagram of a conventional terrestrial wireless telecommunications system.
Figure 2:
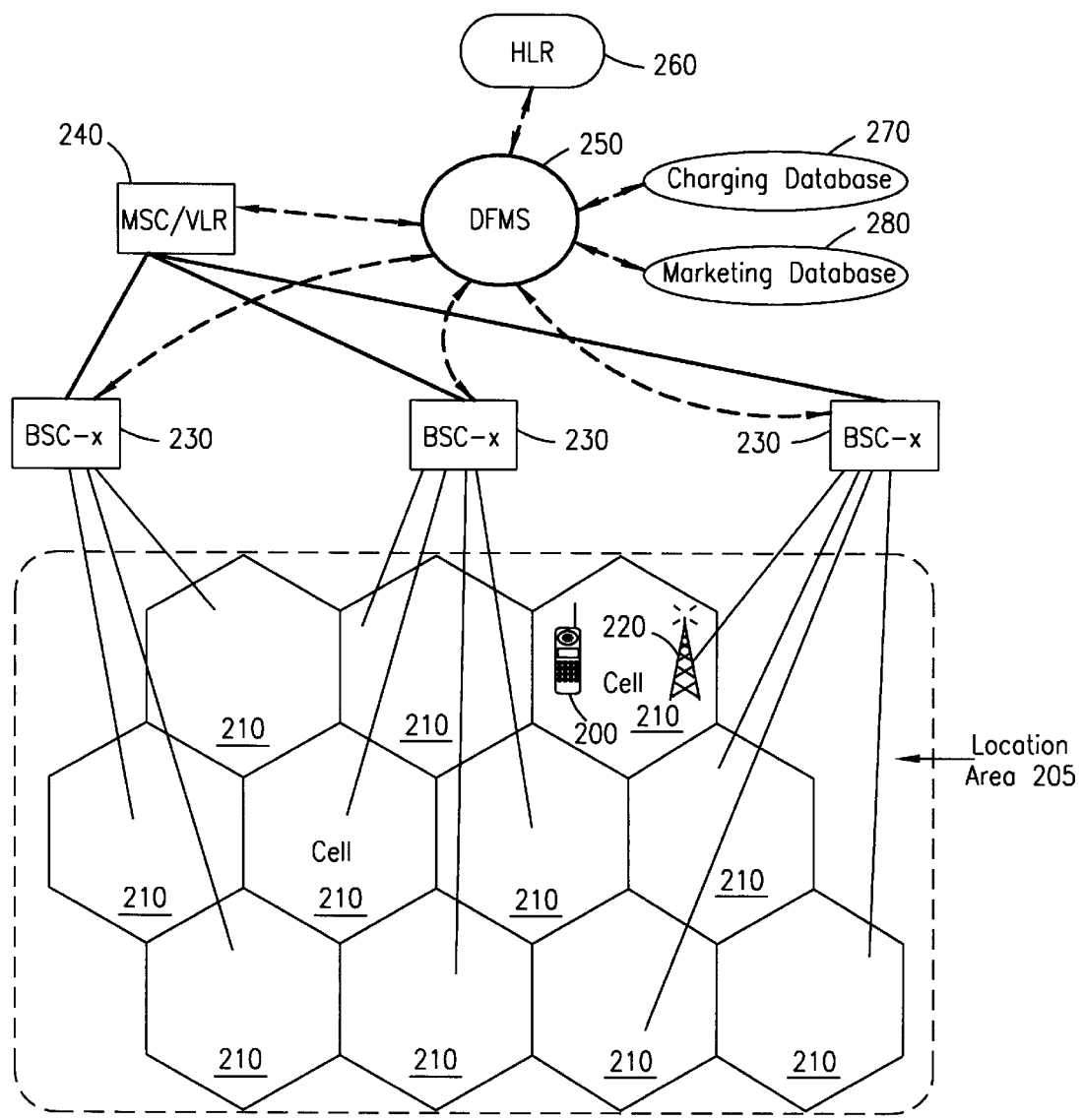
FIG. 2 illustrates the implementation of a dynamic flexible marketing system within a wireless network.

With reference now to FIG. 2 of the drawings, a Dynamic Flexible Marketing System (DFMS) 250 can be implemented within a wireless network 206 to monitor and increase the channel utilization ratio. The DFMS 250 can be either a stand alone unit or integrated with a Mobile Switching Center/Visitor Location Register (MSC/VLR) 240 or a Home Location Register (HLR) 260, the former being illustrated. The DFMS 250 is an algorithm driven decision making system (which could be an expert system), which gathers the channel utilization ratio periodically from Base Station Controllers (BSCs) 230 associated with the MSC/VLR 240 for the DFMS 250. The DFMS 250 also accesses information from the MSC/VLR 230, the HLR 260 and an accounting/marketing database 270 of the wireless network 205.

Figure 3:
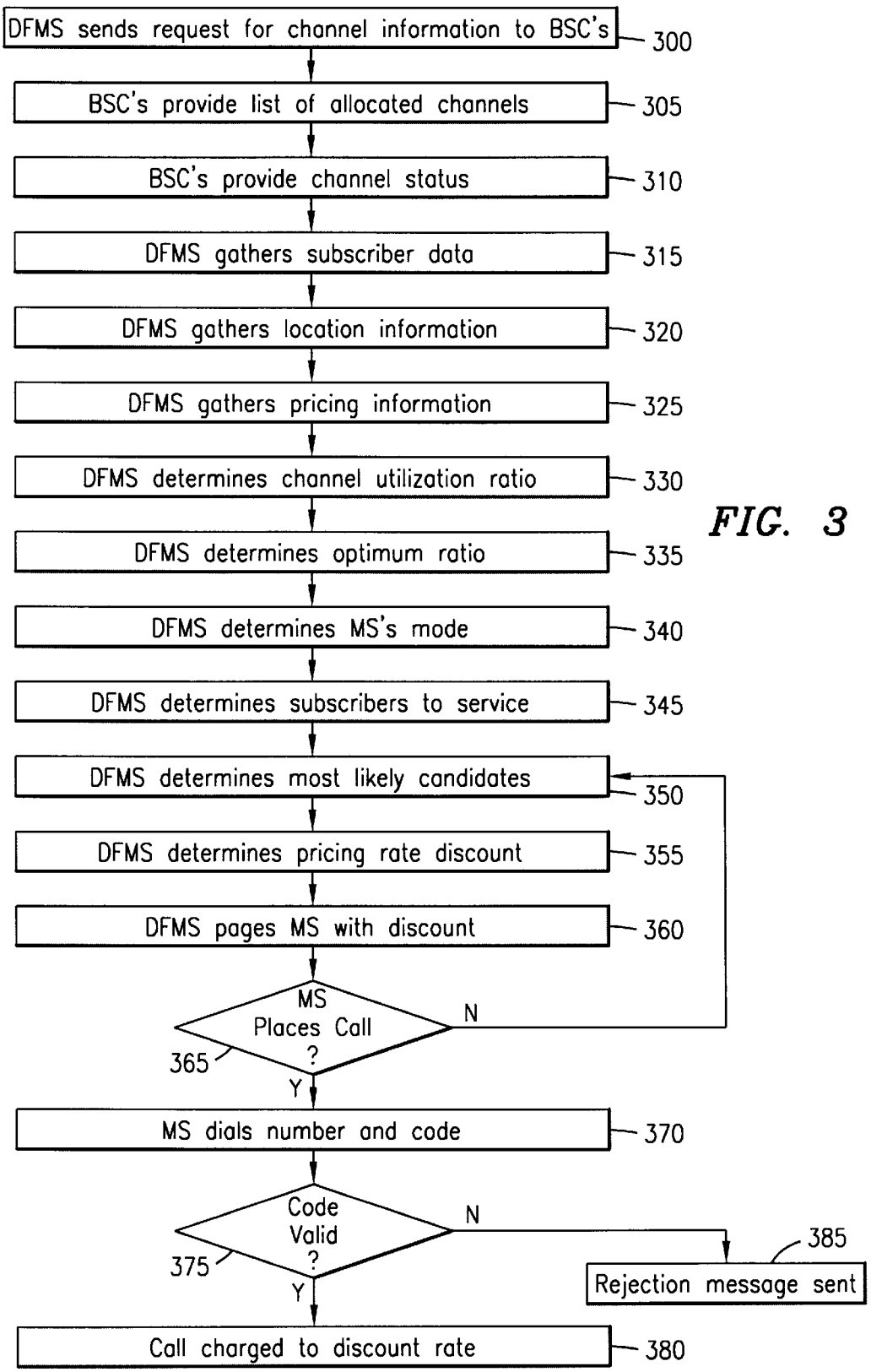
FIG. 3 shows steps in a sample implementation of the flexible marketing system of the present invention.

With reference now to FIG. 3 of the drawings, which will be described in connection with FIG. 2 of the drawings, the optimum channel utilization ratio can be achieved by the DFMS 250 sending a request for channel utilization information to all the BSCs 230 (step 300) served by the MSC/VLR 240 for that DFMS 250. The DFMS 250 sends this request at the beginning of every "processing slot". For example, if the "processing slot" for the DFMS 250 is five minutes, a request will be sent to all BSCs 230 every five minutes. The BSCs 230 can then provide the DFMS 250 with a list of channels that are allocated per cell site 210 (step 305) and their corresponding status (step 310), e.g., "in use" or "idle". In preferred embodiments of the present invention, only the channels with a different status than the status sent in the previous response will be sent to the DFMS 250.

Alternatively, the BSC's 230 can provide the number of idle channels, the number of channels in use, or the number of channels available for the DFMS 250 to assign to subscribers per cell site 210. For example, the BSC's 230 can be provided with the optimum channel utilization ratio per cell site 210 for a certain time period, which is set by the network provider and takes into consideration the time of day, the average expected hand-off, roaming, the normal amount of new calls, the normal amount of calls ending within that time period, and other system functions. If the current channel utilization ratio falls below the optimum channel utilization ratio, the BSC 230 can then send to the DFMS 250 the number of channels that need to be allocated to subscribers within a certain time period in order to achieve an optimum channel utilization ratio.

The DFMS 250 then gathers subscriber data (step 315), such as which subscribers within the location area (LA) 205 served by the MSC/VLR 240 subscribe to the DFMS 250 service and which subscribers within the LA 205 are idle, and current location information (step 320) for each mobile subscriber within the LA 205 from the HLR 260 and MSC/VLR 240 databases. The DFMS 250 also gathers the customer pricing information (step 325), e.g., current charging plan/rate, for each mobile subscriber within the LA 205 from the accounting/marketing database 270. The accounting/marketing database 270 can be located within the DFMS 250 or can be a separate node outside of the DFMS 250. If one of the mobile subscribers is roaming, the serving DFMS 250 can obtain the customer pricing information from the subscriber's home DFMS (not shown). It should be noted that the customer profile and charging information can be gathered simultaneous to the gathering the channel utilization ratio information.

Based upon the input from all the above subsystems, the DFMS 250 then determines the current channel utilization ratio (step 330) and the optimum channel utilization ratio for each cell site 210 (step 335) as described hereinbefore, unless the BSC 230 has already made that determination and forwarded the number of channels to be allocated to the DFMS 250. Thereafter, the DFMS 250 determines which subscribers within each cell site 210 that are in "active" mode, e.g., a Mobile Station (MS) 200 associated with that mobile subscriber has a call connection with another subscriber, and "stand by" mode (step 340), e.g., the MS 200 associated with that mobile subscriber is turned "ON" and can receive Short Message Service (SMS) messages.

The DFMS 250 then cross-references the subscriber data for each MS 200 in "stand by" mode to determine which mobile subscribers have subscribed to the flexible marketing service (step 345) and which mobile subscribers are most likely to participate in the service (step 350). For example, additional marketing analysis can be performed by the DFMS 250 based upon past response by the mobile subscribers to discounted marketing offers, such as reduced rates. This information, e.g., a ratio of the number of times utilized to the number of times offered, can be stored in the customers profile in the HLR 260, retrieved by the DFMS 250, and updated by the DFMS 250. In addition, information regarding the average daily usage of wireless services by each mobile subscriber can be stored by the HLR 260 in the subscriber data and retrieved by the DFMS 250. The utilization ratio and the average daily usage for each mobile subscriber in "stand by" mode can be used to identify the most likely candidates to be given an offer for the flexible marketing service within the "processing slot" (step 350).

After analyzing and identifying the candidate mobile subscribers and their associated cell sites 210 (step 350), the DFMS 250 must then determine the pricing rate for each candidate mobile subscriber (step 355) to be used to trigger the appropriate increase in utilization, and thus achieve the appropriate system utilization ratio. The pricing rate discount information can be identified by performing a look-up into a marketing database 280, which contains prior marketing research. The discount is carefully selected to trigger the appropriate number of new calls to reach the target optimum channel utilization ratio in the under-utilized cell sites 210.

The DFMS 250 can then send a SMS/page or call to each selected MS 200 in each cell site 210 (step 360), via the MSC/VLR 240, BSC 230 and BTS 220, to offer the respective price/feature discount for each selected mobile subscriber. The SMS message can convey information, such as: "If you place a call in the next three minutes and append the following code XXXX to your dialed number, we will charge your call at a discount of Y%". If the subscriber chooses to place a call (step 365) and avail the price discount, then the subscriber must dial the B-number for the called subscriber followed by the system provided code (step 370). This code can be provided to the MSC/VLR 240 by the DFMS 250 with the associated time period, e.g., three minutes. Thus, the MSC/VLR 240 can match the entered code against the current DFMS 250 code to determine whether a discount is valid for this call (step 375). Alternatively, the entered code can be an Intelligent Network (IN) or Advanced Intelligent Network (AIN) trigger to the DFMS 250, which instructs the MSC/VLR 240 to query the DFMS 250 to determine whether the entered code matches the current DFMS 250 code for that subscriber (step 375).

If the entered code matches the current DFMS 250 code for that subscriber (step 375), the call will be charged at the discounted rate (step 380). In addition, in preferred embodiments of the present invention, a series of tones or an acknowledgment message can be sent to the MS 200 to indicate that the code has been accepted and the call is being charged at a discounted rate. If the code does not match, a rejection message can be sent to the MS 200 (step 385), such as: "The code you entered is invalid. Please hang up and try again," or "The code you entered is not valid. To continue your call at your regular rate, please stay on the line." Furthermore, if the desired number of responses is not achieved, e.g., the paged subscriber chooses to not place a call (step 365), in a predetermined amount of time, e.g., 3 minutes, a second set of mobile subscribers are paged (step 350), as discussed hereinbefore.

Alternatively, in order to avail the price discount (step 365), the mobile subscriber could enter a service code, e.g., *99, followed by the code and the dialed number. For example, after the mobile subscriber enters the code, the MSC/VLR 240 or the DFMS 250 can match it against the current DFMS 250 code for that subscriber and if the entered code is accepted, the MSC/VLR 240 can send the MS 200 a series of tones or an acknowledgment message prompting the mobile subscriber to enter the dialed number. Alternatively, the mobile subscriber can enter the service code and the dialed number immediately thereafter and then wait for an acknowledgment message or series of tones to indicate that the code has been accepted. In still a further alternative embodiment, the mobile subscriber can dial a special number associated with the DFMS 250, enter the service code, and if accepted, the DFMS 250 can prompt the mobile subscriber for the dialed number and route the call back to the MSC/VLR 240 for further analysis and routing with an indication of the charging rate.

The price/feature discounts can vary between subscribers and can increase or decrease based upon the channel utilization ratio for each cell site 210. In addition, the subscribers chosen to participate and the cell sites 210 targeted preferably change for each "processing slot" of the DFMS 250. This ensures that the system resources are constantly utilized to a desired ratio.

In alternative embodiments, the DFMS 250 service can be tailored to fit a particular subscribers needs. For example, a subscriber can have the option of "turning off" the pages, e.g., by pressing a service code, if the subscriber does not want to receive the price discount offers from the system. Thereafter, when the subscriber decides to receive the pages again, the subscriber can reactivate the paging, e.g., by pressing an additional service code, in order to receive the discount offer. Furthermore, a subscriber can request the system to send offers only when the discount has reached a certain threshold percentage. For example, a mobile subscriber can dial a number for the DFMS 250 system and choose a discount option, such as "Send me a notification between the times of X and Y only if the discount is less than or equal to Z%". The DFMS 250 can then take this request into consideration when determining which subscribers should be targeted.

In addition, a subscriber can request the system to automatically set up a "system assisted call" to a certain B-number if the discount reaches a certain threshold percentage within a certain time period, each of which are defined by that subscriber. Additionally, the subscriber can request the DFMS 250 to inform the subscriber of the current discount rate for a desired or adjacent cell 210. Furthermore, instead of a price discount, the DFMS 250 can offer other incentives to subscribers, such as discounts on three-way calling, speed dialing, fax calling, or roaming charges.

Figure 4:
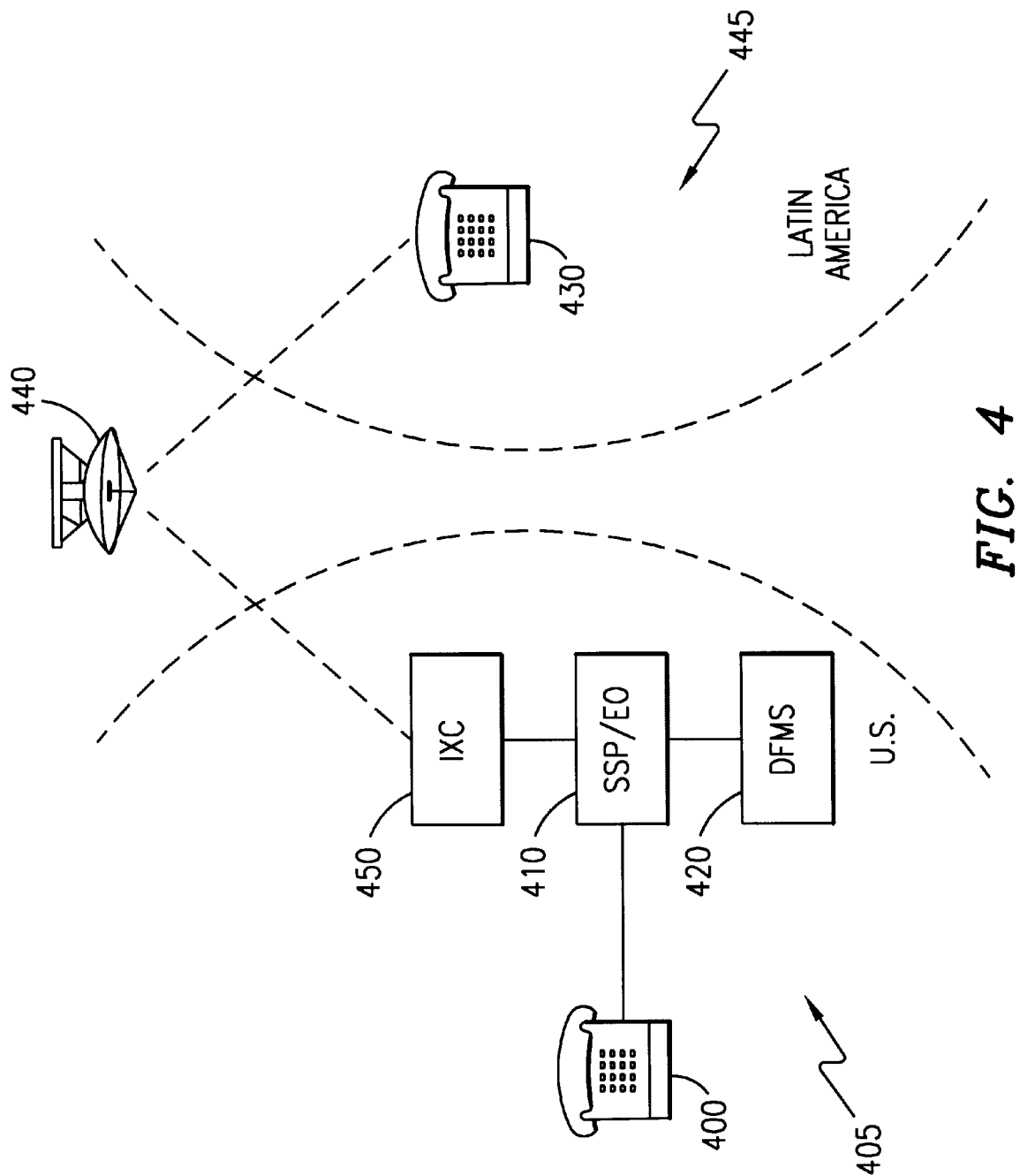
FIG. 4 illustrates the utilization of the flexible marketing system within a wireline network.

In a further alternative embodiment, as shown in FIG. 4 of the drawings, the DFMS system 420 described herein can also be used within a wireline system. In this embodiment, the bandwidth utilization of long-distance links can be substituted for channel utilization. For example, a wireline subscriber 400 within the United States 405 may desire to place a call to a subscriber 430 in Latin America 445, but would like a cheaper long-distance rate. Therefore, the wireline subscriber 400 can call the DFMS 420 and indicate to the DFMS 420 the desired called number and discount rate, e.g., 50 percent off normal rates. Thereafter, the DFMS 420 can monitor the utilization of a satellite link 440 between U.S. and Latin America for a period of time defined by the wireline subscriber 400 to determine when the utilization level falls enough below the desired target utilization level to offer the 50 percent discount.

Once the discount reaches the wireline subscriber's 400 desired discount, the DFMS 420 can place a call to the wireline subscriber 400 and give the subscriber 400 the code for the discount. The wireline subscriber 400 can then place a call to the desired called subscriber 430 with the discounted rate by either appending a code to the called number or entering a service code, followed by the DFMS 420 code and the called number. A switch 410, e.g., a Service Switching Point (SSP) serving the wireline subscriber 400 can then route the call to the called subscriber 430, through an Interexchange Carrier (IXC) 450 and a satellite-adapted base station system (not shown), as is well-known in the art, using the discounted rate. However, if the discount rate does not reach the desired discount rate within the specified period of time, the DFMS 420 can either call the wireline subscriber 400 and inform the subscriber 400 that the desired discount could not be achieved and give the subscriber 400 the current discount or not call back the subscriber 400 at all.

It should be noted that the wireline DFMS 420 system can be applied to any type of long-distance link, including multi-channel calling (wide-band verses narrow-band) and data communications. For example, if a wireline subscriber 400 wishes to send a document to another subscriber 430, the wireline subscriber 400 can request a computer (not shown) to dial the DFMS 420 and indicate to the DFMS 420 the size of document and desired rate. Thereafter, when the discount rate reaches the desired rate, the DFMS 420 can "call" back the computer, instructing the computer to send the document now along with the DFMS 420 discount code. If the desired rate is not achieved within the specified period of time, the wireline subscriber 400 can either program the computer to send the document anyway or to not send the document. Alternatively, the wireline subscriber 400 can ask the DFMS 420 when the lowest rate is usually offered to transmit a document, which can be determined by the accounting/marketing database 280, and then program the computer to send the document at that time.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the DFMS system described herein has been provided from a static fixed frequency allocation per cell perspective. However, it can be expanded to a dynamic frequency hopping system or other systems as well.

In addition, it should be understood that the DFMS system described herein can be immediately implemented in many telecommunications systems, including, but not limited to, the D-AMPS, AMPS, GSM, CDMA, narrow-band or wide-band systems, and wireline networks. The DFMS system can be utilized for television, cable, satellite and Internet connections, or any other system providing bandwidth service to customers.

What is claimed is:

1. A telecommunications system for maximizing the utilization of available bandwidth within said telecommunications system, said telecommunications system comprising:
    a database for storing subscriber information associated with at least one subscriber within said telecommunications system; and
    a dynamic flexible marketing node in communication with said database and said subscriber, said dynamic flexible marketing node determining an optimum bandwidth utilization ratio and a current bandwidth utilization ratio, said dynamic flexible marketing node sending a message to said subscriber when said current bandwidth utilization ratio is lower than said optimum bandwidth utilization ratio, said message having discount information therein associated with a call to be placed by said subscriber, said discount information being determined by said dynamic flexible marketing node based upon said subscriber information.

2. The telecommunications system of claim 1, wherein said telecommunications system is a wireless telecommunications system.

3. The telecommunications system of claim 2, further comprising a mobile switching center in communication with said dynamic flexible marketing node and in wireless communication with said subscriber, said mobile switching center connecting said call between said subscriber and an additional subscriber, using said discount information.

4. The telecommunications system of claim 3, wherein said dynamic flexible marketing node is co-located with said mobile switching center.

5. The telecommunications system of claim 3, further comprising at least one base station in communication with said mobile switching center, said dynamic flexible marketing node sending a channel utilization information request to said base station, said base station sending a channel utilization information response to said dynamic flexible marketing node, said dynamic flexible marketing node determining said current bandwidth utilization ratio using said channel utilization information response.

6. The telecommunications system of claim 5, wherein said dynamic flexible marketing node sends said message to a predetermined number of said subscribers, each said message having a unique one of said discount information associated therewith, said predetermined number of said subscribers corresponding to a predetermined number of channels needing to be allocated to have said current bandwidth utilization ratio equal said optimum bandwidth utilization ratio.

7. The telecommunications system of claim 5, wherein said channel utilization information response is a list of channels, each said channel having a corresponding status.

8. The telecommunications system of claim 5, wherein said channel utilization information response is selected from the group consisting of: a list of idle channels, a list of in use channels, or a number of assignable channels.

9. The telecommunications system of claim 5, wherein said dynamic flexible marketing node has a plurality of processing slots associated therewith, said dynamic flexible marketing node sending said channel utilization information request to said base station during each said processing slot.

10. The telecommunications system of claim 2, wherein said database is a home location register.

11. The telecommunications system of claim 10, wherein said subscriber data comprises subscription information and location information associated with said at least one subscriber.

12. The telecommunications system of claim 10, wherein said dynamic flexible marketing node is co-located with said home location register.

13. The telecommunications system of claim 2, further comprising a charging database in communication with said dynamic flexible marketing node, said charging database providing pricing information associated with said at least one subscriber to said dynamic flexible marketing node, said dynamic flexible marketing node determining said discount information using said pricing information.

14. The telecommunications system of claim 13, further comprising a marketing database in communication with said dynamic flexible marketing node, said marketing database providing marketing information associated with said at least one subscriber to said dynamic flexible marketing node, said dynamic flexible marketing node determining said discount information using said pricing information and said marketing information.

15. The telecommunications system of claim 14, wherein said marketing database and said charging database are located within said dynamic flexible marketing node.

16. The telecommunications system of claim 3, wherein said at least one subscriber has a mobile terminal associated therewith, said mobile terminal being in wireless communication with said mobile switching center, said message being a Short Message Service message sent to said mobile terminal, said Short Message Service message having a code therein, said subscriber entering said code on said mobile terminal to avail said discount information.

17. The telecommunications system of claim 1, wherein said discount information is selected from the group consisting of: price discount, conference calling discount, speed dialing discount, fax calling discount, Internet discount, international calling discount, E-mail sending discount or roaming discount.

18. The telecommunications system of claim 1, wherein said telecommunications system is a wireline system.

19. The telecommunications system of claim 18, wherein said database is a switch connected to said at least one subscriber, said switch connecting said call between said at least one subscriber and an additional subscriber.

20. The telecommunications system of claim 18, wherein said at least one subscriber sends a discount request to said dynamic flexible marketing node, said message being sent to said at least one subscriber when said discount information equals said discount request.

21. A method for maximizing the utilization of available bandwidth within a telecommunications system, said method comprising the steps of:

sending, by a database having subscriber information associated with at least one subscriber within said telecommunications system stored therein, said subscriber information to a dynamic flexible marketing node;

determining, by a dynamic flexible marketing node, an optimum bandwidth utilization ratio and a current bandwidth utilization ratio for said telecommunications system; and sending, by said dynamic flexible marketing node, a message to said subscriber when said current bandwidth utilization ratio is lower than said optimum bandwidth utilization ratio, said message having discount information therein associated with a call to be placed by said subscriber, said discount information being determined by said dynamic flexible marketing node based upon said subscriber information.

22. The method of claim 21, wherein said telecommunications system is a wireless telecommunications system.

23. The method of claim 22, further comprising, after said step of sending said message, the step of:

connecting, by a mobile switching center in communication with said dynamic flexible marketing node and in wireless communication with said subscriber, said call between said subscriber and an additional subscriber, using said discount information.

24. The method of claim 23, wherein said dynamic flexible marketing node is co-located with said mobile switching center.

25. The method of claim 23, further comprising, before said step of determining, the steps of:

sending, by said dynamic flexible marketing node, a channel utilization information request to at least one base station in communication with said mobile switching center; and sending, by said base station, a channel utilization information response to said dynamic flexible marketing node, said step of determining being performed using said channel utilization information response.

26. The method of claim 25, wherein said step of sending said message is performed by said dynamic flexible marketing node sending said message to a predetermined number of said subscribers, each said message having a unique one of said discount information associated therewith, said predetermined number of said subscribers corresponding to a predetermined number of channels needing to be allocated to have said current bandwidth utilization ratio equal said optimum bandwidth utilization ratio.

27. The method of claim 25, wherein said channel utilization information response is a list of channels, each said channel having a corresponding status.

28. The method of claim 25, wherein said channel utilization information response is selected from the group consisting of: a list of idle channels, a list of in use channels, or a number of assignable channels.

29. The method of claim 25, wherein said dynamic flexible marketing node has a plurality of processing slots associated therewith, said step of sending said channel utilization information request to said base station being performed during each said processing slot.

30. The method of claim 22, wherein said database is a home location register.

31. The method of claim 30, wherein said subscriber data comprises subscription information and location information associated with said at least one subscriber.

32. The method of claim 30, wherein said dynamic flexible marketing node is co-located with said home location register.

33. The method of claim 22, further comprising, before said step of sending said message, the step of:

providing, by a charging database in communication with said dynamic flexible marketing node, pricing information associated with said at least one subscriber to said dynamic flexible marketing node, said dynamic flexible marketing node determining said discount information using said pricing information.

34. The method of claim 33, further comprising, before said step of sending said message, the step of:

providing, by a marketing database in communication with said dynamic flexible marketing node, marketing information associated with said at least one subscriber to said dynamic flexible marketing node, said dynamic flexible marketing node determining said discount information using said pricing information and said marketing information.

35. The method of claim 34, wherein said marketing database and said charging database are located within said dynamic flexible marketing node.

36. The method of claim 23, wherein said at least one subscriber has a mobile terminal associated therewith, said mobile terminal being in wireless communication with said mobile switching center, said message being a Short Message Service message sent to said mobile terminal, said Short Message Service message having a code therein; and further comprising, after said step of sending said message, the step of:

entering, by said subscriber, said code on said mobile terminal to avail said discount information.

37. The method of claim 21, wherein said discount information is selected from the group consisting of: price discount, conference calling discount, speed dialing discount, fax calling discount, Internet discount, international calling discount, E-mail sending discount or roaming discount.

38. The method of claim 21, wherein said telecommunications system is a wireline system.

39. The method of claim 38, wherein said database is a switch connected to said at least one subscriber, and further comprising, after said step of sending said message, the step of:

connecting, by said switch, said call between said at least one subscriber and an additional subscriber.

40. The method of claim 38, further comprising, before said step of sending said subscriber information, the step of:

sending, by said at least one subscriber, a discount request to said dynamic flexible marketing node, said step of sending said message being performed when said discount information equals said discount request.

\* \* \* \* \*